(12) United States Patent
Torres Sainz et al.

(10) Patent No.: US 12,735,115 B2
(45) Date of Patent: Sep. 15, 2026

(54) HOOD AND STORAGE COMPARTMENT FOR A VEHICLE

(71) Applicant: Ford Global Technologies, LLC, Dearborn, MI (US)

(72) Inventors: Pablo Torres Sainz, Naucalpan (MX); Luis Manuel Mendoza Vega, Santiago Tianguistenco (MX); David Zavala Sanchez, Metepec (MX); Omar Eduardo Valdez Hernandez, Cuautitlan Izcalli (MX); David Michael Kehrer, Macomb, MI (US); Mark Joseph Courtright, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 478 days.

(21) Appl. No.: 18/504,746

(22) Filed: Nov. 8, 2023

(65) Prior Publication Data

US 2025/0145225 A1 May 8, 2025

(51) Int. Cl.
*B62D 25/10* (2006.01)
*B62D 25/08* (2006.01)

(52) U.S. Cl.
CPC .......... *B62D 25/087* (2013.01); *B62D 25/10* (2013.01)

(58) Field of Classification Search
CPC .... B62D 25/087; B62D 25/10; B62D 25/105; B62D 25/12
USPC ............................................... 296/37.1, 37.2
See application file for complete search history.

(56) References Cited

U.S. PATENT DOCUMENTS

| | | | | |
|---|---|---|---|---|
| 5,090,105 | A | 2/1992 | DeRees | |
| 6,293,860 | B1 | 9/2001 | Kim | |
| 8,388,047 | B2 * | 3/2013 | Schmidt | B62D 25/087 296/203.02 |
| 8,641,133 | B1 | 2/2014 | Scaringe et al. | |
| 9,352,693 | B2 * | 5/2016 | Tanaka | B62D 25/12 |
| 10,173,739 | B2 | 1/2019 | Bellis et al. | |
| 10,195,999 | B1 * | 2/2019 | Glickman | B62D 25/085 |
| 10,717,471 | B2 * | 7/2020 | Glickman | B62D 25/12 |
| 10,875,581 | B2 * | 12/2020 | Sakurai | F16F 15/02 |
| 10,926,705 | B2 | 2/2021 | Hoffman et al. | |

(Continued)

FOREIGN PATENT DOCUMENTS

| | | | |
|---|---|---|---|
| CN | 115583201 | A | 1/2023 |
| DE | 4318080 | A1 | 4/1994 |

(Continued)

OTHER PUBLICATIONS

Espacenet translation JP 553 (Year: 2013).*

*Primary Examiner* — Hilary L Gutman
(74) *Attorney, Agent, or Firm* — Vichit Chea; Price Heneveld LLP

(57) ABSTRACT

A trunk assembly for a vehicle includes a stowage compartment disposed within the vehicle. The stowage compartment defines a stowage compartment opening. A hood is operable between an opened position and a closed position. The hood includes an outer panel and an inner panel coupled to the outer panel. A waterfall structure is integrally formed with a front section of the hood inner panel and extends outward from the front section. The waterfall structure abuts the stowage compartment to at least partially seal the stowage compartment opening when the hood is in the closed position.

14 Claims, 9 Drawing Sheets

(56) References Cited

U.S. PATENT DOCUMENTS

| | | | | |
|---|---|---|---|---|
| 10,953,721 | B2 * | 3/2021 | Gruber | H01M 10/615 |
| 11,420,565 | B2 * | 8/2022 | Ritter | B60R 13/013 |
| 11,618,388 | B2 * | 4/2023 | Gombert | B60R 19/12<br>280/784 |
| 11,858,463 | B2 * | 1/2024 | Rucker | E05C 3/14 |
| 11,891,017 | B2 * | 2/2024 | Kukla | B60R 5/02 |
| 11,912,237 | B2 * | 2/2024 | Harmon | B60R 5/02 |
| 12,005,862 | B2 * | 6/2024 | Harmon | B60R 3/02 |
| 12,311,868 | B2 * | 5/2025 | Schellekens | B60R 21/34 |
| 12,441,169 | B1 * | 10/2025 | Hammer | B60J 10/86 |
| 12,466,494 | B2 * | 11/2025 | Baier | B62D 29/043 |
| 12,479,512 | B2 * | 11/2025 | Friedrich | B62D 25/087 |
| 12,522,145 | B2 * | 1/2026 | Grantham | B60R 5/02 |
| 12,605,988 | B2 * | 4/2026 | Doroudian | B60H 1/248 |
| 2003/0071481 | A1 * | 4/2003 | Igarashi | B60J 5/101<br>296/76 |
| 2004/0012975 | A1 | 1/2004 | Chase et al. | |
| 2004/0066061 | A1 * | 4/2004 | Engels | B60R 19/18<br>296/193.08 |
| 2005/0001452 | A1 | 1/2005 | White et al. | |
| 2010/0140979 | A1 | 6/2010 | Seksaria et al. | |
| 2017/0057560 | A1 * | 3/2017 | Murakami | B62D 25/105 |
| 2017/0144717 | A1 * | 5/2017 | Bellis | B62D 65/028 |
| 2018/0065672 | A1 * | 3/2018 | Maier | B60R 5/02 |
| 2020/0262482 | A1 * | 8/2020 | Makowski | B62D 25/12 |
| 2020/0307713 | A1 * | 10/2020 | Nishino | B62D 25/105 |
| 2021/0086840 | A1 * | 3/2021 | Glickman | B62D 25/24 |
| 2021/0114525 | A1 * | 4/2021 | Mazzarella | B32B 3/266 |
| 2021/0237652 | A1 * | 8/2021 | Mazzarella | B60R 5/02 |
| 2021/0284242 | A1 * | 9/2021 | Yamaoka | B62D 21/152 |
| 2022/0009419 | A1 * | 1/2022 | Kim | B60R 5/02 |
| 2022/0105989 | A1 * | 4/2022 | Cote | B62D 25/12 |
| 2022/0355738 | A1 * | 11/2022 | Gill | B60R 19/52 |
| 2022/0371519 | A1 * | 11/2022 | Weber | B60R 5/02 |
| 2023/0060547 | A1 * | 3/2023 | Mellergård | B62D 25/12 |
| 2023/0115536 | A1 * | 4/2023 | Nagai | B62D 25/12<br>49/501 |
| 2023/0192001 | A1 * | 6/2023 | Mellergård | B60R 5/00<br>296/37.1 |
| 2025/0108767 | A1 * | 4/2025 | Salter | B60R 11/0235 |
| 2025/0346298 | A1 * | 11/2025 | Marrufo Rogel | B62D 25/105 |

FOREIGN PATENT DOCUMENTS

| | | | | | |
|---|---|---|---|---|---|
| DE | 102018206316 | A1 | * | 10/2019 | E05D 7/12 |
| DE | 102019007850 | A1 | * | 5/2021 | B60R 21/34 |
| DE | 102022101236 | A1 | | 7/2022 | |
| DE | 102022102386 | U1 | | 9/2022 | |
| EP | 0634316 | A1 | | 1/1995 | |
| EP | 1844993 | A1 | | 10/2007 | |
| FR | 2899177 | A1 | * | 10/2007 | B60R 5/02 |
| JP | 01285431 | A | * | 11/1989 | |
| JP | 2012106653 | A | * | 6/2012 | |
| JP | 2013166553 | A | * | 8/2013 | |
| KR | 20020056064 | A | | 7/2002 | |
| WO | WO-2007115062 | A1 | * | 10/2007 | B62D 25/08 |

* cited by examiner 10
20
22
24
28
30
32
34
36
50
52
54
70
72
80
82
16
18
120
130
140
142
144
150
152
154
160
162
170
172
176
180
182
184
190
192
230
240
250
252
260
270

HOOD AND STORAGE COMPARTMENT FOR A VEHICLE

FIELD OF THE DISCLOSURE

The present disclosure generally relates to a vehicle, in particular, to a vehicle with a trunk assembly.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a trunk assembly for a vehicle is provided. The truck assembly includes a stowage compartment disposed within the vehicle, the stowage compartment including a base portion and a sidewall encircling the base portion, wherein the sidewall defines a stowage compartment opening and a hood operable between an opened position and a closed position. The hood further including an outer panel, an inner panel coupled to the hood outer panel. The hood outer panel extends over an outer periphery of the hood inner panel, and a waterfall structure integrally formed with a front section of the hood inner panel and extending outward from the front section, the waterfall structure abutting the sidewall to define a sealed interface when the hood is in the closed position. The hood also includes a palm dimpler at least partially disposed on a top portion of the waterfall structure, the palm dimpler at least partially coupling the outer panel to the inner panel.

Embodiments of the first aspect of the present disclosure can include any one or a combination of the following features:

- the stowage compartment defines a front region and a top region, and the inner panel abuts the sidewall proximate the top region and the waterfall structure abuts the sidewall proximate the front region when the door is in the closed position to define a sealed interface;
- the waterfall structure includes a top portion, a center portion, and a bottom portion, wherein the bottom portion includes a first section obliquely extending from the center portion and a second section extending from the first section, and the second section extends in a direction parallel to the center portion;
- the angle of extension of the first section coincides with an angle of the sidewall proximate the front region, and wherein the first section abuts the sidewall proximate the front region when the door is in the closed position to define a sealed interface;
- the inner panel defines a pair of recesses on opposing sides of a top portion of the waterfall structure, and wherein the palm dimpler extends into the pair of recesses;
- an inner panel lip extending along an outer periphery of the inner panel, wherein the inner panel lip at least partially extends vehicle-forward beyond the waterfall structure;
- a trim piece coupled to the sidewall, the trim piece abutting the inner panel when the door is in the closed position to at least partially define a sealed interface;

- the palm dimpler includes an upper portion and a lower portion extending downward from the upper portion, and wherein the upper portion abuts a top surface of the inner panel and the lower portion abuts the waterfall structure; and
- a first plurality of protrusions defined on the front section of the inner panel and the waterfall structure and a second plurality of protrusions defined on the palm dimpler, wherein the second plurality of protrusions overlap the first plurality of protrusions to at least partially coupled the palm dimpler to the inner panel.

According to a second aspect of the present disclosure, a hood for a vehicle is provided. The hood includes an outer panel, an inner panel coupled to the outer panel, wherein the outer panel extends over an outer periphery of the inner panel, and a waterfall structure extending outward from a front section of the inner panel.

Embodiments of the second aspect of the present disclosure can include any one or a combination of the following features:

- the inner panel includes an inner panel lip extending around an outer periphery of the inner panel;
- a first recess defined on the front section of the inner panel and proximate a side of the waterfall structure and a second recess defined on an opposing side of the waterfall structure, and the inner panel lip proximate the first recess and the second recess at least partially extends beyond the waterfall structure;
- the waterfall structure includes a top portion, a middle portion, and a bottom portion, and wherein the bottom portion includes a first section obliquely extending from the middle portion and a second section extending front the first section in a direction parallel to the middle portion; and
- a palm dimpler at least partially disposed on the waterfall structure, the palm dimpler at least partially coupling the outer panel to the inner panel, wherein the palm dimpler includes an upper portion and a lower portion extending downward from the upper portion, and wherein the upper portion abuts a top surface of the inner panel and the lower portion abuts the top portion of the waterfall structure.

According to a third aspect of the present disclosure, a trunk assembly for a vehicle is provided. The truck assembly includes a stowage compartment disposed within the vehicle, the stowage compartment defining a stowage compartment opening, and a hood operable between an opened position and a closed position. The hood further including an outer panel, an inner panel coupled to the hood outer panel, wherein the hood outer panel extends over an outer periphery of the hood inner panel, and a waterfall structure integrally formed with a front section of the hood inner panel and extending outward from the front section. The waterfall structure abutting the stowage compartment to at least partially seal the stowage compartment opening when the hood is in the closed position.

Embodiments of the third aspect of the present disclosure can include any one or a combination of the following features:

- a palm dimpler at least partially disposed on the waterfall structure, the palm dimpler at least partially coupling the outer panel to the inner panel;
- a first plurality of protrusions defined on the front section of the inner panel and the waterfall structure and a second plurality of protrusions defined on the palm dimpler, wherein the second plurality of protrusions overlap the first plurality of protrusions to at least partially coupled the palm dimpler to the inner panel;

the inner panel defines a first recess on a side of the waterfall structure and a second recess on an opposing side of the waterfall structure, and wherein the palm dimpler includes a lower portion that at least partially extends into the first recess and the second recess;

the stowage compartment includes a base portion and a sidewall encircling the base portion, wherein the sidewall defines the stowage compartment opening; and the stowage compartment opening defines a top region and a front region, and wherein the waterfall structure at least partially seals the front region when the door is in the closed position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
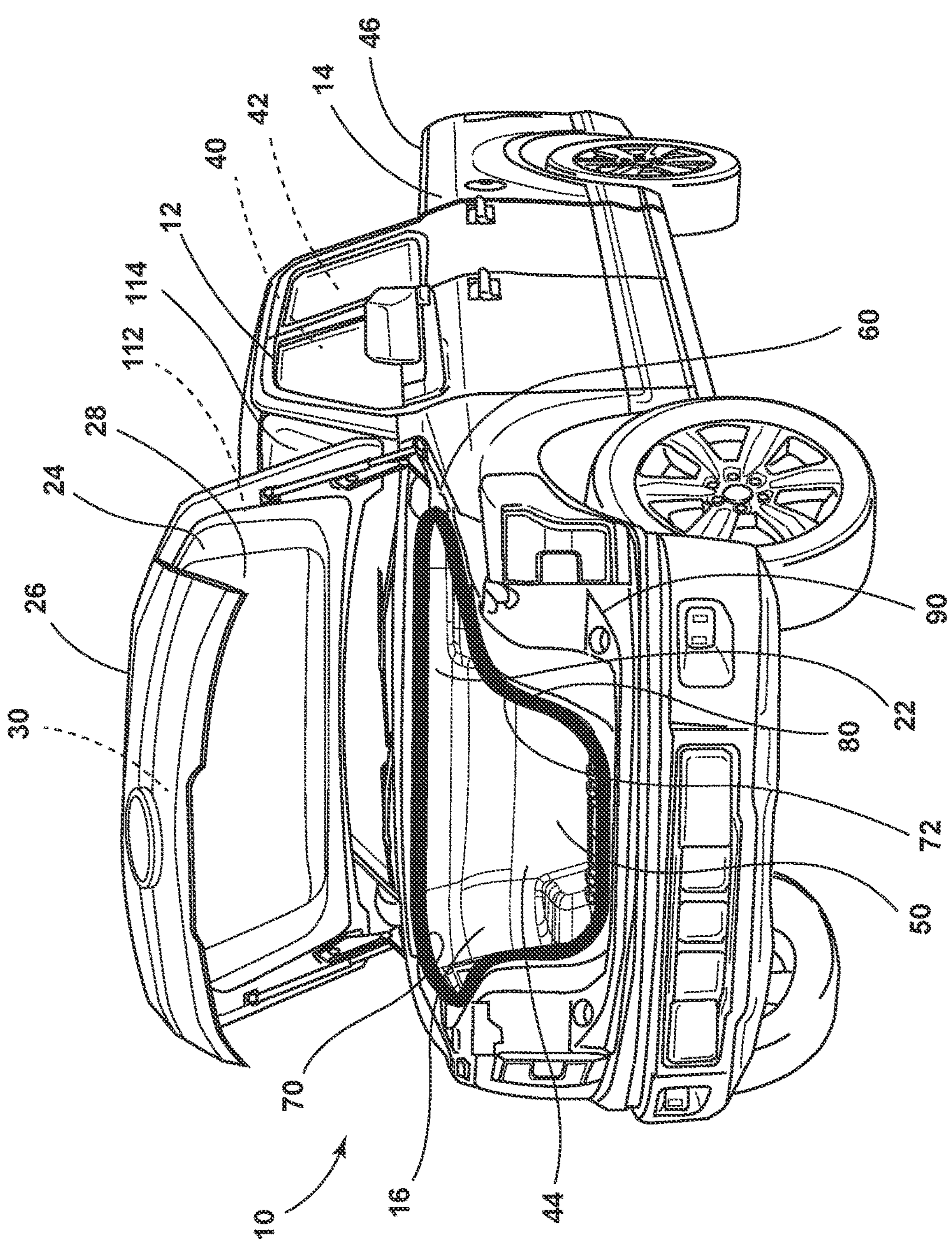
FIG. 1 is a perspective view of a vehicle with a trunk assembly, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a trunk assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Hereinafter, the term "frunk" is a portmanteau of the words "front" and "trunk" that refers to the storage space under the hood of a vehicle that has traditionally been occupied by an internal combustion engine, but may not in the case of a vehicle with a rear-mounted engine or an electric vehicle, and/or various other vehicles.

Referring now to FIGS. 1-9, a vehicle 12 includes a vehicle body 14 with a trunk assembly 10. The trunk assembly 10 includes a stowage compartment 16 disposed within the vehicle 12. The stowage compartment 16 includes a base portion 18 and a sidewall 20 encircling the base portion 18. The sidewall 20 defines a stowage compartment opening 22. A hood 24 is coupled to the vehicle body 14. The hood 24 is operable between an opened position and a closed position. The hood 24 comprises an outer panel 26 and an inner panel 28 coupled to the outer panel 26. A waterfall structure 30 is integrally formed with a front section 32 of the inner panel 28 and extends outward from the front section 32. The waterfall structure 30 abuts the sidewall 20 to define a sealed interface when the hood 24 is in the closed position. A palm dimpler 34 is at least partially disposed on a top portion 36 of the waterfall structure 30. The palm dimpler 34 at least partially couples the outer panel 26 to the inner panel 28.

Figure 2:
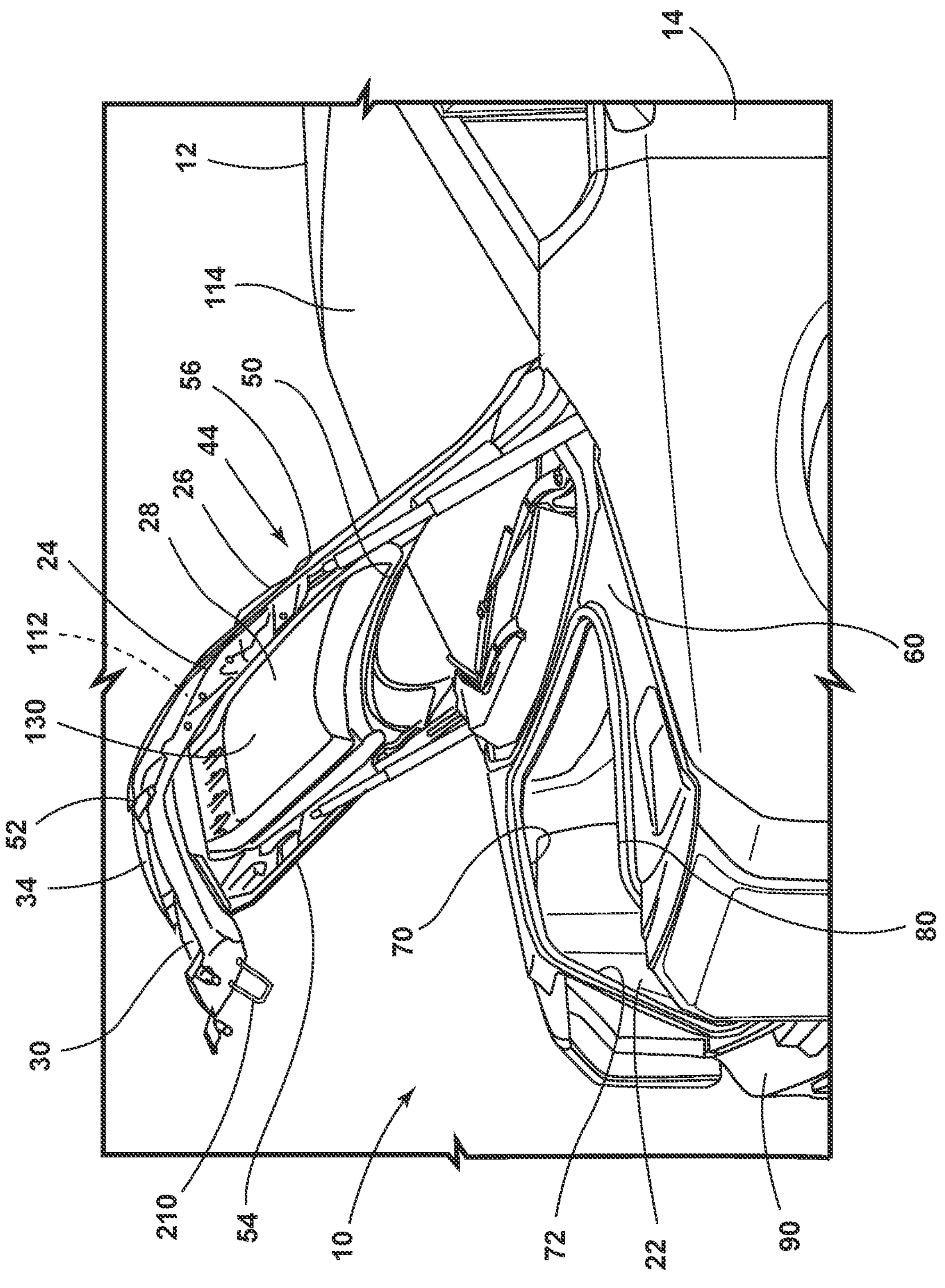
FIG. 2 is a side perspective view of a vehicle with a trunk assembly with an inner panel and a waterfall structure, according to one embodiment.
Figure 3:
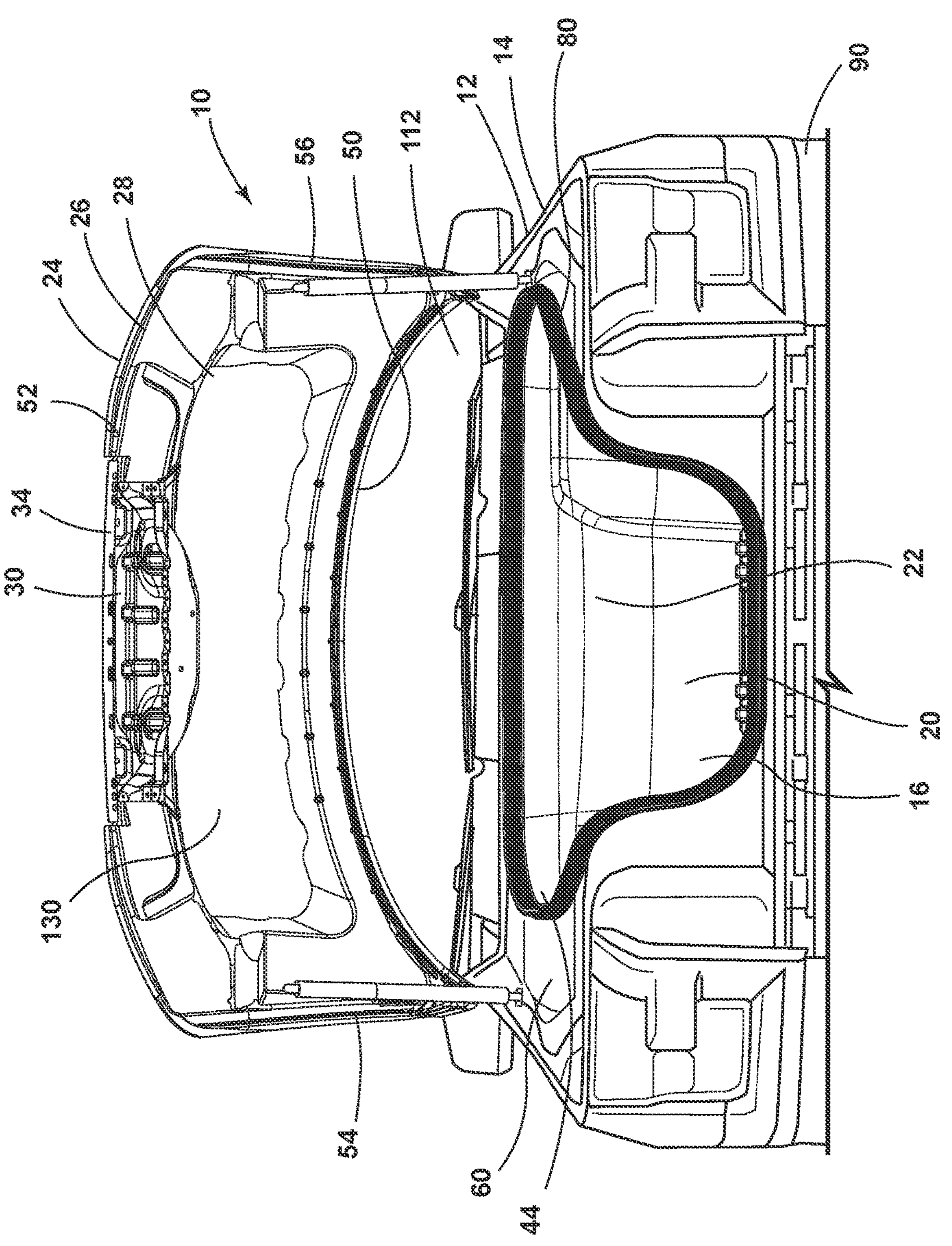
FIG. 3 is a front elevational view of a vehicle with a trunk assembly with an inner panel and a waterfall structure, according to one embodiment.
Figure 4:
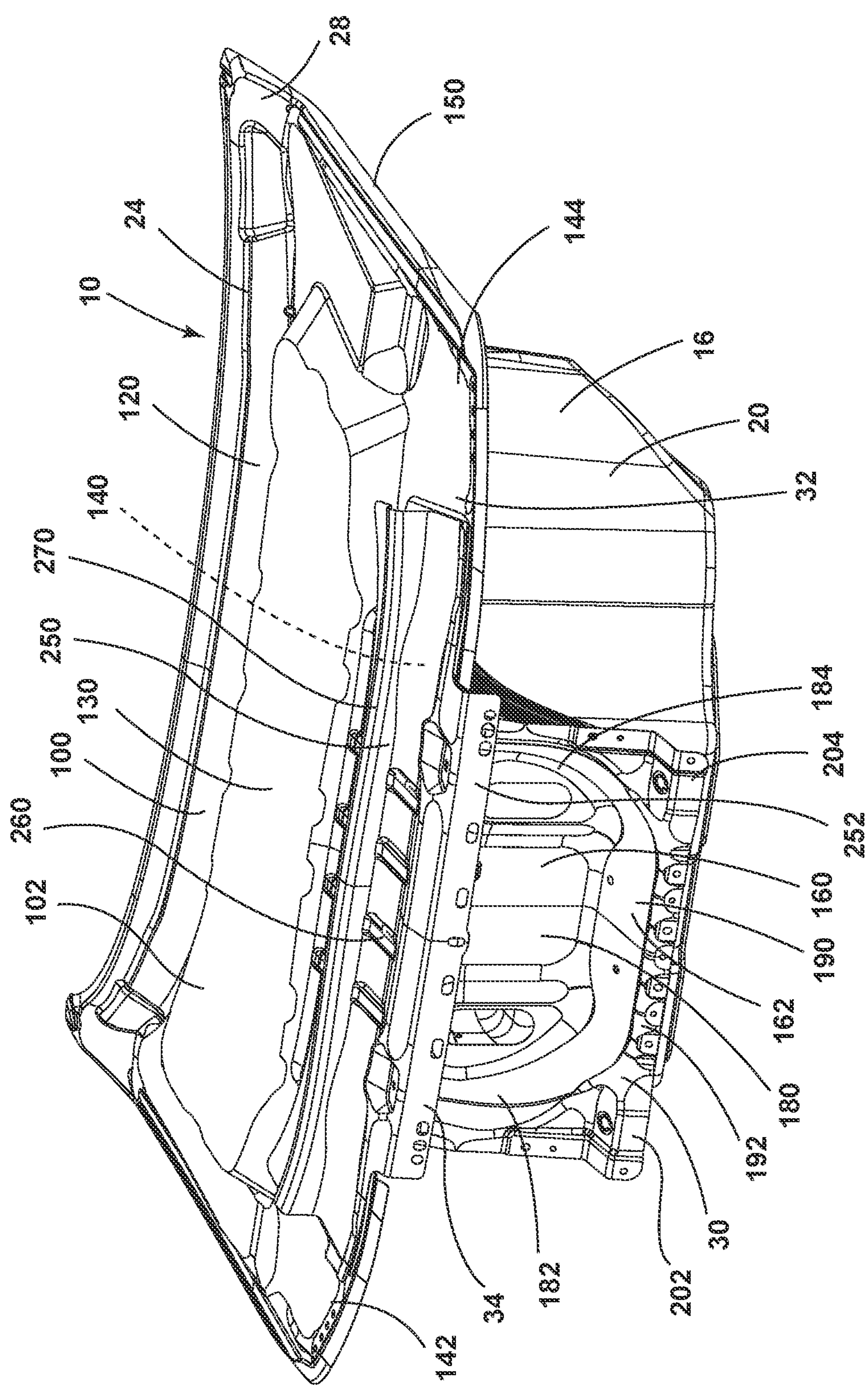
FIG. 4 is a trunk assembly showing the hood with the inner panel and the waterfall structure in a closed position over a stowage compartment, according to one embodiment.
Figure 5:
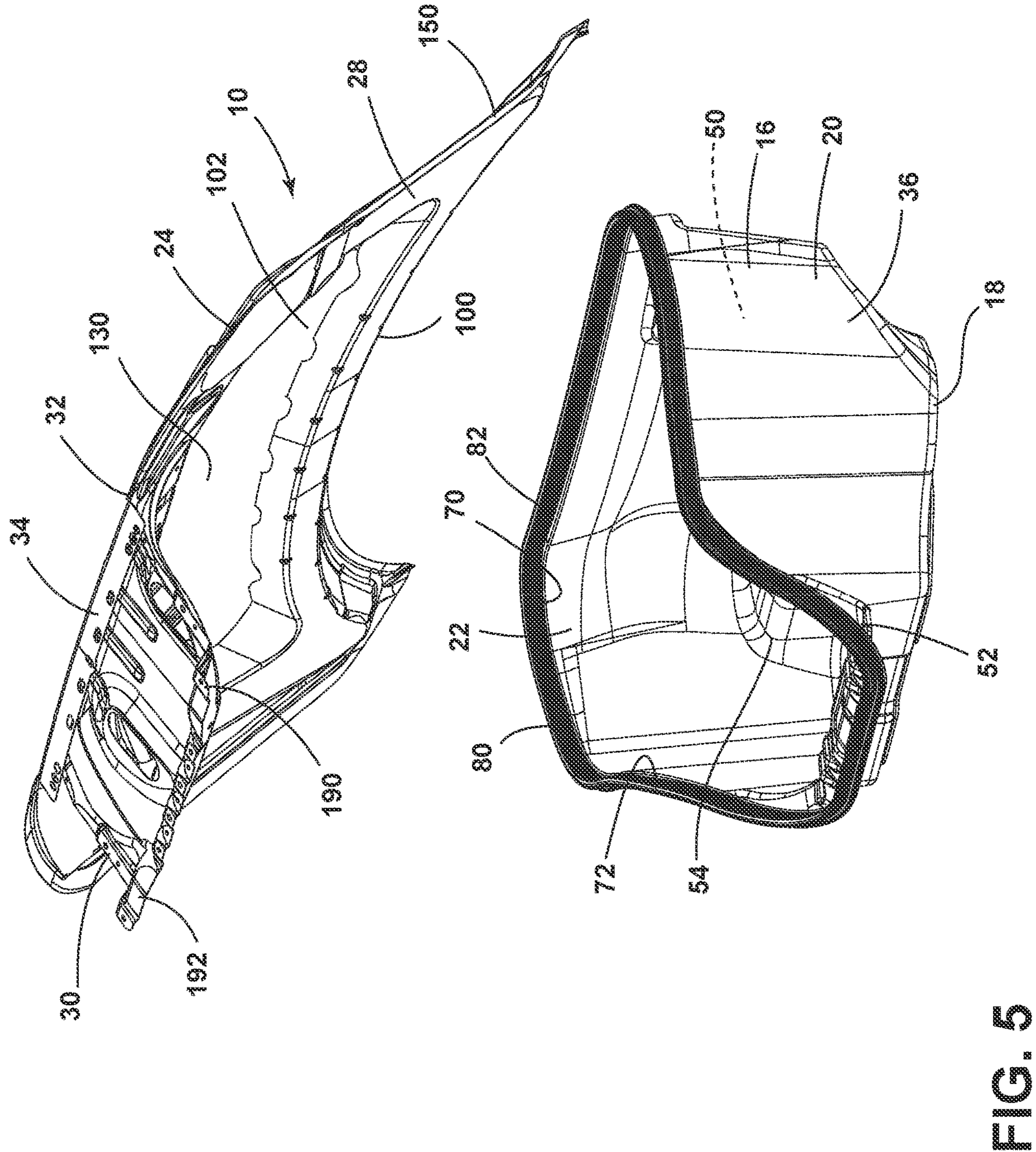
FIG. 5 is perspective, partially exploded view of a hood and stowage compartment of a trunk assembly, according to one embodiment.

Referring now to FIGS. 1-3, depicted is the vehicle 12. The vehicle 12 includes the vehicle body 14 with a vehicle interior 40 that has a passenger compartment 42. In various examples, the vehicle 12 may be one of various kinds of vehicles, such as a sedan, a sport utility vehicle (SUV), a truck, a van, a crossover, and/or other types of vehicles. The vehicle 12 may be a manually operated vehicle (e.g., with a human driver), a fully autonomous vehicle (e.g., no human driver), or a partially autonomous vehicle (e.g., may be operated with or without a human driver).

Referring now to FIGS. 1-3, the vehicle 12 includes one or more storage compartments. The vehicle 12 may include a front trunk 44, commonly referred to as a "frunk," at a front end of the vehicle 12 that is operably accessible via a vehicle hood 24, and a cargo bed 46 extending rearward from the vehicle interior 40. According to various aspects, the vehicle 12 may include additional and/or other storage compartments, such as a trunk, and other various storage compartments. It is further generally contemplated that the storge compartments of the vehicles may be of various shapes and/or sizes.

Referring now to FIGS. 1-8, the vehicle 12 includes the stowage compartment 16. In some examples, the stowage compartment 16 is recessed into the vehicle body 14 of the vehicle 12. For example, the stowage compartment 16 may be disposed within the vehicle body 14 such that the stowage compartment 16 is inward of a front grille and recessed towards the vehicle interior 40, as illustrated in FIGS. 1-3. According to various aspects, the shape and/or size of the stowage compartment 16 may at least partially coincide with various vehicle 12 aspects. For example, the shape and/or size of the stowage compartment 16 may be at least partially determined by a vehicle 12 drive train, and/or the distance between a front end 90 of the vehicle 12 and the vehicle interior 40.

Referring further to FIGS. 5-8, the stowage compartment 16, in some examples, includes the base portion 18 and the sidewall 20 encircling the base portion 18. In some examples, the base portion 18 can include a rear segment 50, a front segment 52 opposing the rear segment 50 and extending vehicle-forward, and opposing side segments 54, 56. In other examples, the base portion 18 may include one or more protrusions that coincide with various aspects of the vehicle. For example, the base portion 18 may include opposing protrusions that are vehicle-upward of opposing wheel wells of the vehicle 12. Additionally, it is generally contemplated that the vehicle may include one or more various other protrusions that coincide with various other aspects of the vehicle 12. In some examples, the base portion 18 may define one of various shapes, such as a quadrilateral shape, a rounded shape, a trapezoidal shape, and/or one of other various shapes.

Referring again to FIGS. 5-8, the sidewall 20 encircles the base portion 18 and is integrally formed with and/or coupled to the base portion 18. In some examples, the sidewall 20 extends upward from the base portion 18. In such examples, the sidewall 20 may extend upward from the base portion 18 such that the sidewall 20 is recessed, flush to, or protruding from cladding 60 that encircles the stowage compartment 16. According to various aspects, the sidewall 20 may protrude from the base portion 18 at varying lengths along an outer periphery of the base portion 18. For example, the height of the sidewall 20 proximate the rear segment 50 of the base portion 18 may be greater or lesser than the height of the sidewall 20 proximate the front segment 52 and/or the opposing side segments 54, 56.

According to various aspects, the sidewall 20 may define the stowage compartment opening 22. The stowage compartment 16 opening may be defined as the space encircled by the sidewall 20, as illustrated in FIGS. 1-8. In some examples, the stowage compartment opening 22 may define a top region 70 that generally opposes the base portion 18, and a front region 72 that extends downward from the top region 70 and towards the front segment 52 of the base portion 18. According to various aspects, the stowage compartment opening 22 may define a shape and/or size that coincides with the shape and/or size of the stowage compartment base portion 18, sidewall 20, and/or the size or shape of the hood 24, as provided herein.

According to various aspects, the sidewall 20 may abut the hood 24 such that a sealed interface is defined via a trim piece 80. The trim piece 80 may be coupled to the top region 70 of the sidewall 20 such that the trim piece 80 encircles the outer periphery of the base portion 18. In some examples, the trim piece, may define an opening and a rounded top section, such that a top portion 82 of the sidewall 20 may be inserted through the opening and reside within the rounded top section. In such examples, the opening of the trim piece 80 may be slightly undersized relative to the trim piece 80 such that a compressive force is exerted on the top portion 82 of the sidewall 20 and the trim piece 80 is coupled to the top portion 82. In various aspects, the trim piece 80 may be made from a material that at least partially deforms in response to an abutment with the hood 24. For example, the trim piece 80 may be made of a softer durometer rubber that deforms as the trim piece 80 abuts the hood 24.

The stowage compartment 16 is operably sealed via the hood 24. The hood 24 may be pivotably coupled to a front end 90 of the vehicle 12 such that the hood 24 may pivot between an opened position and a closed position such that a user may selectively seal and access the stowage compartment 16. In some examples, the hood includes the outer panel 26, the inner panel 28 coupled to the outer panel 26, the palm dimpler 34 coupled to the inner panel 28, as provided herein.

The outer panel 26 of the hood 24 is coupled to the front end 90 of the vehicle 12. According to various aspects, the outer panel 26 may define one of various shapes and/or sizes. For example, the outer panel 26 may define a shape that coincides with the shape and/or size of the front end 90 of the vehicle 12. In such examples, the outer panel 26 may extend over a portion, or an entirety of the front end 90 of the vehicle 12. In other examples, the outer panel 26 may have a shape and/or size that coincides or differs from the shape and/or size of the inner panel 28. For example, the outer panel 26 can be slightly oversized relative to the inner panel 28 such that the outer panel 26 extend over an outer periphery of the inner panel 28.

The inner panel 28 is coupled to the outer panel 26. In some examples, the inner panel 28 is a separate component coupled to the outer panel 26, or the inner panel 28 is at least partially integrally formed with the outer panel 26. According to various aspects, the inner panel 28 includes a rear section 100, a central section 102 extending off of the rear section 100, and the waterfall structure 30 extending from a front region 72 of the central section 102. It is further generally contemplated that the inner panel 28 may include, or define, various other aspects, as provided herein.

The rear section 100 of the inner panel 28 is coupled to the outer panel 26. In some examples, the rear section 100 is coupled to the outer panel 26 and extends vehicle-forward from the outer panel 26. The rear section 100 may obliquely extend vehicle-forward relative to the outer panel 26, and/or the rear section 100 may extend vehicle-forward in a direction parallel or perpendicular with the outer panel 26. In yet other aspects, the rear section 100 may extend vehicle-forward such that the rear section 100 obliquely extends towards the front end 90 of the vehicle 12 and away from the outer panel 26 such that the central section 102 is at least partially distal from an interior surface 112 of the outer panel 26. In various aspects, the rear section 100 may define one of various shapes, for example, the rear section 100 may have an arced portion that coincides with various vehicle aspects, such as a wind shield 114 of the vehicle 12. In such aspects, the shape and/or size of the rear section 100 can coincide or differ with the shape of the central section 102, as provided herein.

The central section 102 of the inner panel 28 is coupled to the outer panel 26. In some examples, a top surface 120 of the inner panel 28 is coupled to the interior surface 112 of the outer panel 26. In other aspects, the central section 102 is coupled to the rear section 100 and extends towards the front end 90 of the vehicle 12. In such aspects, the central section 102 may be proximate to the interior surface 112 of the outer panel 26 as the central section 102 extends towards the front end 90. Additionally, the central section 102 may be at least partially distal to the interior surface 112 of the outer panel 26 as the central section 102 extends towards the front end 90. For example, the rear section 100 may obliquely extend away from the outer panel 26 and towards the front end 90 and the central section 102 may extend towards the front end 90 in a direction parallel to the outer panel 26 such that the central section 102 is distal with the interior surface 112 of the outer panel 26. In various aspects, the central section 102 has a shape and/or size that coincides with the shape and/or size of the outer panel 26. For example, the central section 102 can be slightly undersized relative to the outer panel 26.

In various examples, the central section 102 may include a protruding region 130 that extends towards the interior surface 112. The protruding region 130 may extend towards the outer panel 26 such that the protruding region 130 is proximate to, and/or abouts the interior surface 112. In such examples, the protruding region 130 may be vehicle-upward of the stowage compartment 16 such that the height of protrusion of the protruding region 130 increases storage capacity of the stowage compartment 16.

Referring further to FIGS. 4-9, the front section 32 of the inner panel 28 extends off of the central section 102. The front section 32 can be coupled to, or integrally formed with, the central section 102. In some examples, the front section 32 extends from the central section 102 and towards the front end 90 of the vehicle 12. The front section 32 may extend such that the front section 32 is recessed, flush, or protruding from the vehicle 12. The front section 32 can include a middle portion 140, a first side portion 142, and a second side portion 144 opposing the middle portion 140. According to various aspects, each portion 140, 142, 144 can extend in a direction parallel to, or oblique from the outer panel 26. In such aspects, each portion 140, 142, 144 may be recessed from, or proximate to the interior surface 112 of the outer panel 26. According to various aspects, the front section 32 is configured to permit extension of the waterfall structure 30 and coupling of the palm dimpler 34, as provided herein.

Figure 7:
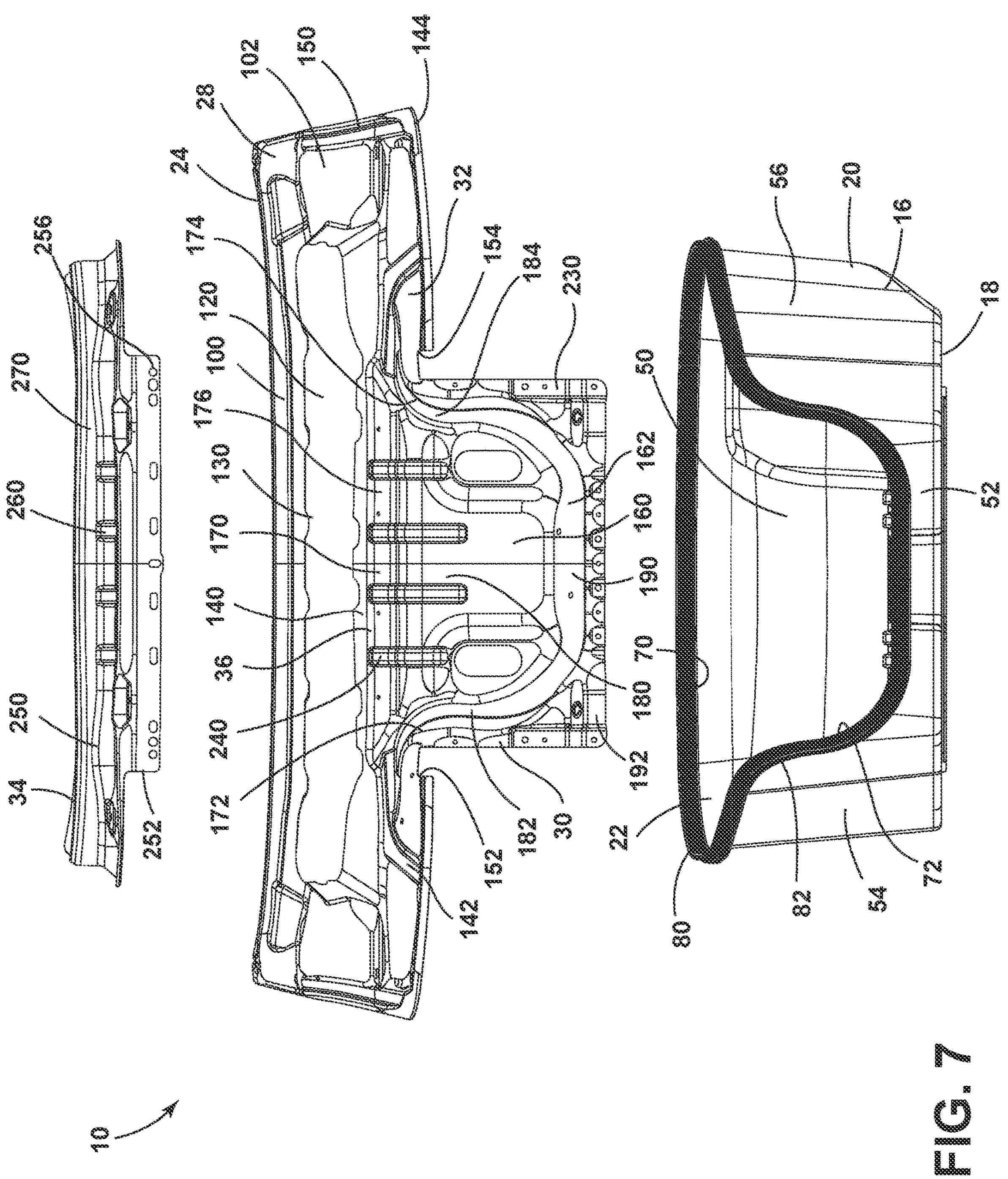
FIG. 7 is a front elevational, exploded view of a hood with an inner panel, a waterfall structure, and a palm dimpler and a stowage compartment, according to one embodiment.
Figure 9:
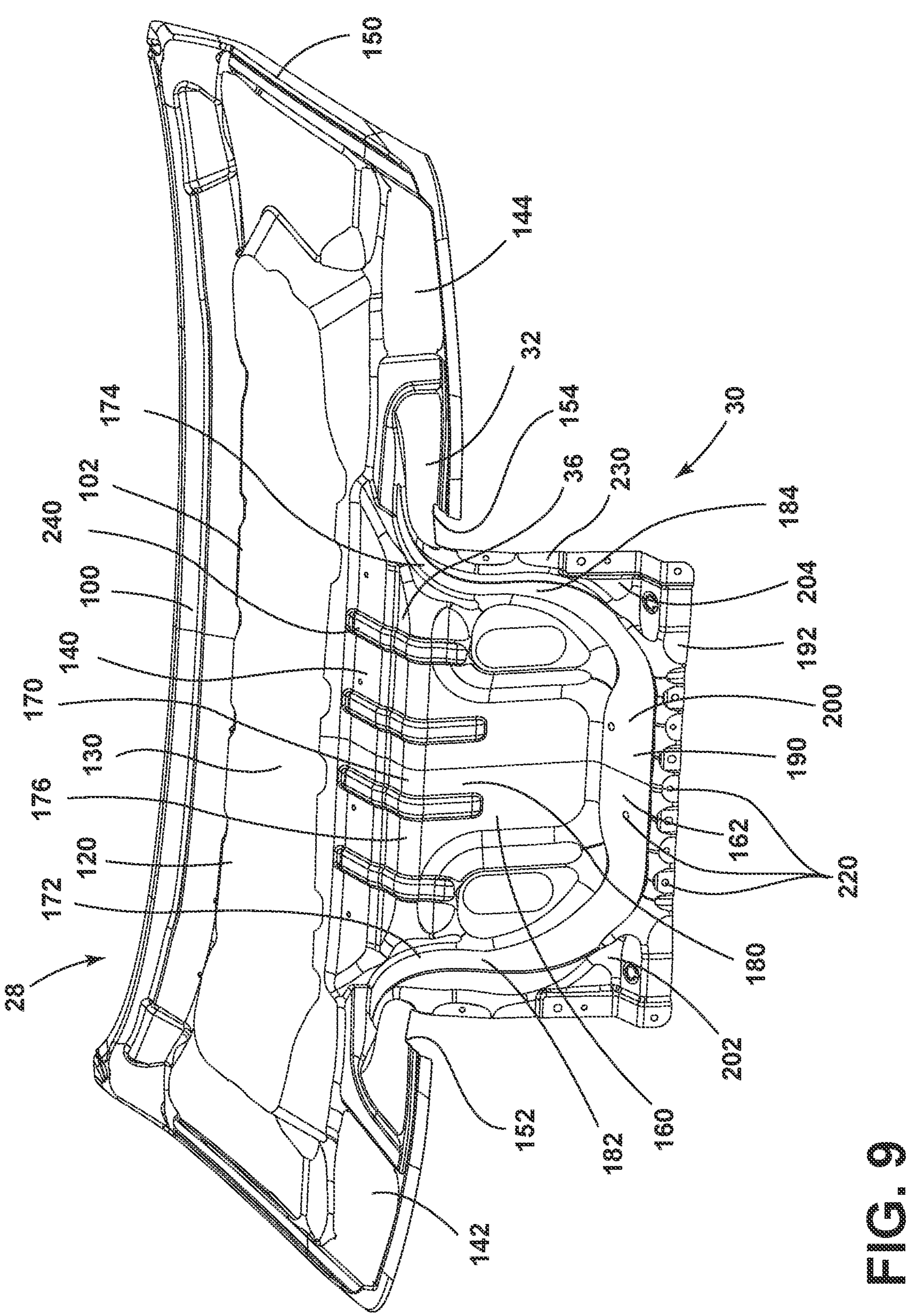
FIG. 9 is a front perspective view of an inner panel and a waterfall structure, according to one embodiment.

According to various aspects, inner panel 28 can include an inner panel lip 150 that extends around an outer periphery of the inner panel 28. The inner panel lip 150 may extend outward from the inner panel 28 such that the inner panel lip 150 extends outward from each section 32, 100, 102 of the inner panel 28. In some examples, the inner panel lip 150 extends from a first recess 152 defined on a front section 32 of the inner panel 28, along an outer periphery of the inner panel 28 and to a second recess 154 defined on the front section 32, as illustrated in FIGS. 7 and 9. In such examples, the inner panel lip 150 may extend vehicle forward proximate the front section 32 of the inner panel 28 such that the inner panel lip 150 at least partially extends vehicle-forward beyond the waterfall structure 30.

According to various aspects, the front section 32 of the inner panel 28 may define one or more recessed regions near the top portion 36 of the waterfall structure 30. For example, the front section 32 may define the first recess 152 and the second recess 154. The first recess 152 may be defined on one side of the waterfall structure 30 (i.e., the top portion 36) and the second recess 154 may be defined on the other, opposing side of the waterfall structure 30. In various aspects, the first and second recess 152, 154 may define one of various shapes, such as a quadrilateral shape and/or a rounded shape. According to various aspects, the first and second recess 154 may permit installation of various components of the vehicle 12. For example, the first and second recess 154 may have a depth such that the palm dimpler 34 may be coupled to the inner panel 28 such that ends of the palm dimpler 34 abut the front section 32 of the inner panel 28 proximate the first and second recess 154. It is also generally contemplated that the first and second recess 154 may aid in assembly of the inner panel 28 and the waterfall structure 30. For example, the first and second recess 154 may permit bending of a metal inner panel about the front section 32 or the top portion 36. It is further generally contemplated that the first and second recess 154 may aid in the assembly of various other vehicle components, such as a vehicle grille that may be attached to the front end 90 of the vehicle and at least partially extend into the first and second recess 154.

Referring to FIGS. 2-9, the hood 24 includes the waterfall structure 30. The waterfall structure 30 can be coupled to, or integrally formed with, the inner panel 28. In some examples, the waterfall structure 30 is integrally formed with the front section 32 of the inner panel 28. For example, the waterfall structure 30 and the inner panel 28 may be integrally formed from a single material or component, such as a stamped metal, a formed polymer, and/or an additively manufactured component. The waterfall structure 30 can include the top portion 36 that extends generally vehicle downward from the front section 32, a middle portion 160 that extends off the top portion 36, and a bottom portion 162 that extends off of the middle portion 160, as provided herein. According to various aspects, the waterfall structure 30 extends downward from the inner panel 28 and operably covers and may operably seal the front region 72, and at least partially the top region 70, of the stowage compartment opening 22.

Referring further to FIGS. 5-9, the top portion 36 of the waterfall structure 30 may extend off the front section 32 of the inner panel 28. In some examples, the top portion 36 includes a recessed central region 170 and protruding side regions 172, 174 that protrude vehicle forward. In such examples, the protruding side regions 172, 174 may operably abut the trim piece 80 proximate the front region 72 of the stowage compartment opening 22 to assist in defining a sealed interface between the waterfall structure 30 and the stowage compartment 16. The central region 170 may define one of various shapes, such as one or more protrusions that extend vehicle-forward and/or vehicle-rearward. For example, the central region 170 may define an engagement lip 176 that is configured to engage with the palm dimpler 34, as provided herein.

Referring again to FIGS. 6-9, the middle portion 160 of the waterfall structure 30 extends off the top portion 36. In some examples, the middle portion 160 extends off the top portion 36 and towards the bottom portion 162. The middle portion 160 may include a recessed central segment 180 and protruding side segments 182, 184 on opposing sides of the recessed central segment 180. In some examples, the recessed central segment 180 may be integrally formed with the central region 170 of the top portion 36, and the protruding side segments 182, 184 may be integrally formed with the protruding side regions 172, 174 of the top portion 36 such that both the top portion 36 and the middle portion 160 are part of a single component. According to various aspects, the protruding side segments 182, 184 of the middle portion 160 operably abut the trim piece 80 proximate the front region 72 of the stowage compartment opening 22 to assist in defining a sealed interface between the waterfall structure 30 and the stowage compartment 16. Additionally, it is generally contemplated that the middle portion 160 may define one of various shapes, such as one or more protrusions that extend vehicle-forward and/or vehicle-rearward.

Figure 8:
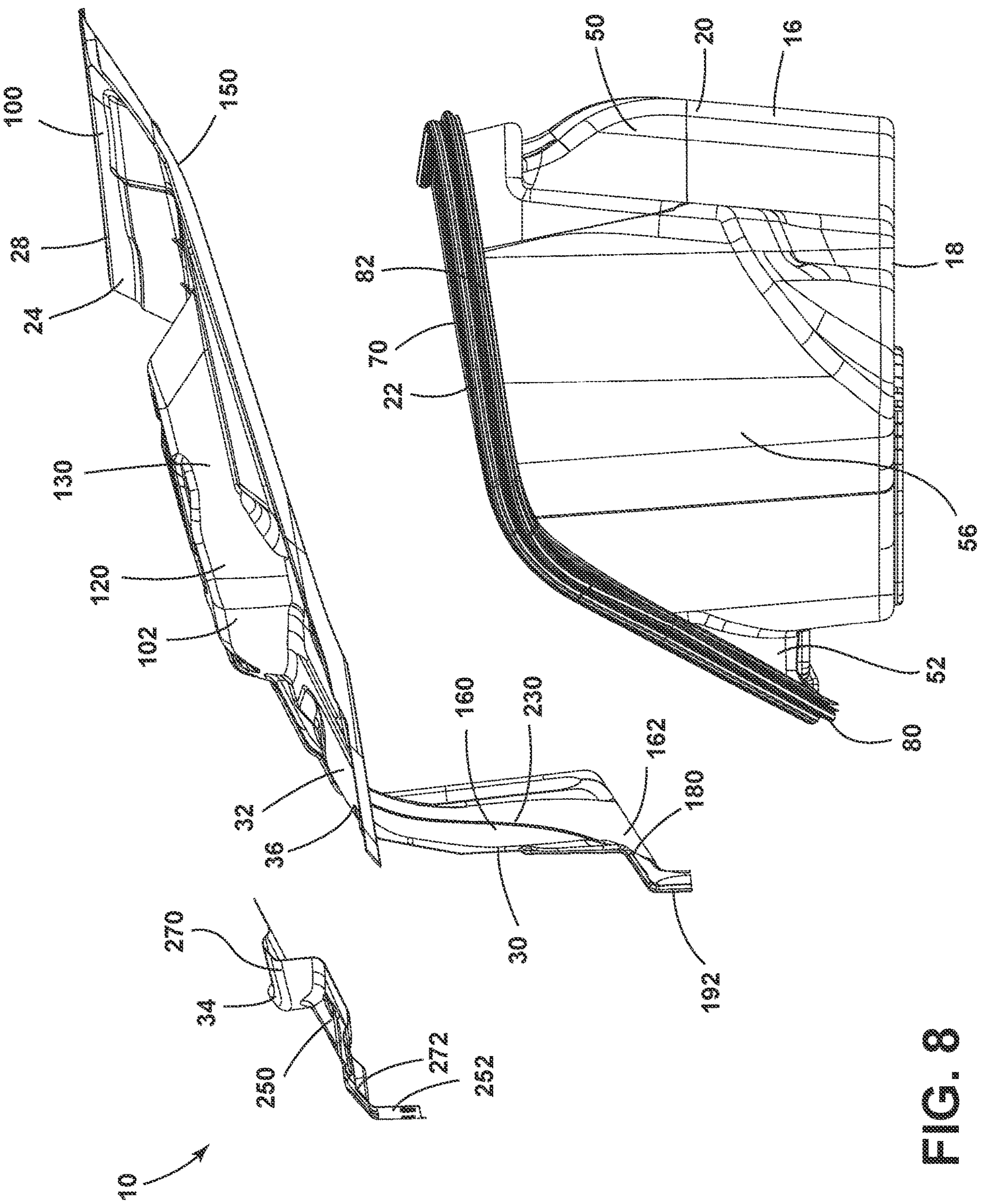
FIG. 8 is a side elevational, exploded view of a hood with an inner panel, a waterfall structure, and a palm dimpler and a stowage compartment, according to one embodiment.

Referring further to FIGS. 6-9, the bottom portion 162 extends off the middle portion 160. In some examples, the bottom portion 162 is coupled to, or integrally formed with the middle portion 160 and extends off the middle portion 160. The bottom portion 162 may obliquely extend from the middle portion 160 such that the bottom portion 162 extends vehicle-downward and vehicle-forward, as illustrated in FIG. 8, or the bottom portion 162 may extend off the middle portion 160 in a direction substantially perpendicular, or parallel, to the middle portion 160. In some examples, the bottom portion 162 may include a first section 190 that extends off the middle portion 160 and a second section 192 that extends off the first section 190. In such examples, the first section 190 and/or the second section 192 may extend in a direction parallel with, oblique to, or perpendicular with the middle portion 160. For example, the first section 190 may obliquely extend vehicle-downward and vehicle-forward from the middle portion 160, and the second section 192 may extend vehicle downward from the first section 190 in a direction substantially parallel with the middle portion 160.

According to various aspects, the bottom portion may include a center section 200 and side sections 202, 204 on opposing sides of the center section 200. In some examples, the center section 200 may be integrally formed with the central segment 180 of the middle portion 160 and/or the central region 170 of the top portion 36, and the side sections 202, 204 may be integrally formed with the side segments 182, 184 of the middle portion 160 and/or the side regions 172, 174 of the top portion 36, such that the waterfall structure 30 is a single, continuous component. According to various aspects, the center section 200 and/or the side sections 202, 204 may abut the trim piece 80 proximate the front region 72 of the stowage compartment opening 22 to assist in defining a sealed interface between the waterfall structure 30 and the stowage compartment 16. Additionally, it is generally contemplated that the center section 200 may coupled to various other components, such as a hook 210 to couple the hood 24 to the vehicle body 14 and/or various other components. It is further generally contemplated that the bottom portion 162 includes an aperture 220, or a plurality of apertures 220, that are defined on the bottom portion 162. The apertures 220 may be configured to receive one or more fasteners that couple the waterfall structure 30 to one or more various vehicle components, such as a vehicle trim piece, a vehicle grill piece, and/or other various vehicle components.

According to various embodiments, the waterfall structure 30 with the top, middle, and bottom portions 36, 160, 162 may define a shape that coincides with the shape of the stowage compartment 16. In some examples, the sidewall 20 of the stowage compartment 16 may increase in height as the sidewall 20 extends away from the front end 90 of the vehicle 12 such that the sidewall 20 tapers towards the front end 90 of the vehicle 12 and the front region 72 of the stowage compartment opening 22 defines an angled opening. In such examples, the waterfall structure 30 may likewise be angled such that the waterfall structure 30, or a portion thereof, is parallel with the front region 72 of the stowage compartment opening 22. Further, in such examples, the waterfall structure 30 can be oriented such that a sealed interface is defined between the waterfall structure and the trim piece 80 as the waterfall structure 30 abuts the trim piece 80.

Referring to FIGS. 5-9, the waterfall structure 30 can include a waterfall structure lip 230. The waterfall structure lip 230 may extend around an outer periphery of the waterfall structure 30. In some aspects, the waterfall structure lip 230 may extend outward from the outer periphery of the waterfall structure 30. For example, the waterfall structure lip 230 may extend outward from the waterfall structure lip 230 proximate the recesses 152, 154 and extend along the outer periphery of the middle portion 160 and the bottom portion 162. In such examples, the waterfall structure lip 230 may extend vehicle-outward from the top portion 36, the middle portion 160, and the bottom portion 162 (i.e., the first section 190) and/or vehicle-downward from the bottom portion 162 (i.e., the second section 192). According to various aspects, the waterfall structure lip 230 is configured to abut the trim piece 80 and extend over the trim piece 80 such that the waterfall structure lip 230 assists in at least partially defining a sealed interface between the waterfall structure 30 and the trim piece 80.

According to various aspects, the hood 24 may define a first plurality of protrusions 240 that are defined on the inner panel 28 and/or the waterfall structure 30. In some examples, the first plurality of protrusions 240 includes protrusions 240 that protrude outward and extend from the front section 32 of the inner panel 28 to the middle portion 160 of the waterfall structure 30. Each protrusion 240 may define one or various shapes, such as a quadrilateral shape, a rounded shape, and/or one of other various shapes. According to various aspects, the first plurality of protrusions 240 are configured to assist in coupling the inner panel 28 to the palm dimpler 34.

Referring now to FIGS. 4-8, the hood 24 includes the palm dimpler 34. The palm dimpler 34 can be coupled to the outer panel 26, the inner panel 28, and/or the waterfall structure 30. In some examples, the palm dimpler 34 includes an upper portion 250 and a lower portion 252 extending off of the upper portion 250. In some examples, the upper portion 250 extends along the top surface 120 of the inner panel 28 and towards the rear section 100 of the inner panel 28. The lower portion 252 may abut the waterfall structure 30 and extend vehicle-downward in a direction perpendicular to the upper portion 250. According to various aspects, the palm dimpler 34 may define one or more fastener apertures 256 that are configured to receive fasteners (e.g., rivets) that are configured to couple the palm dimpler 34 to the outer panel 26, the inner panel 28, and/or the waterfall structure 30. In various aspects, the palm dimpler 34 is configured to couple the outer panel 26 to the inner panel 28 and to provide for a reinforced region that a user may contact when opening and closing the hood 24. For example, a user, desiring to move the hood 24 to the closed position may grasp the hood 24 proximate the palm dimpler 34 and exert a downward force on the hood 24 proximate the palm dimpler 34 such that the hood 24 moves to the closed position.

Figure 6:
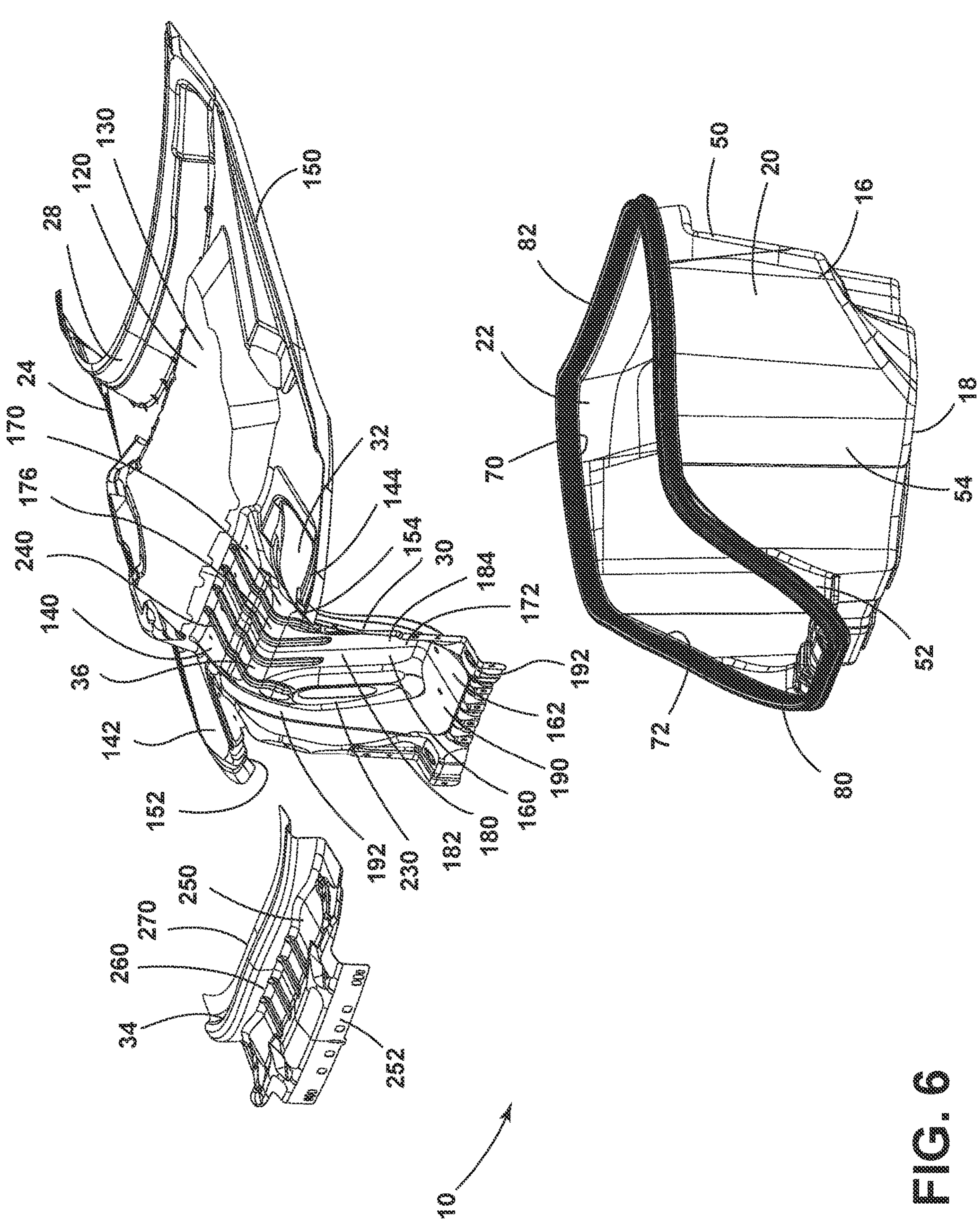
FIG. 6 is a perspective, exploded view of a hood with an inner panel, a waterfall structure, and a palm dimpler and a stowage compartment, according to one embodiment.

According to various aspects, the palm dimpler 34 may define a second plurality of protrusions 260. The second plurality of protrusions 260 are defined on the upper portion 250 of the palm dimpler 34, as illustrated in FIGS. 6 and 7. In some examples, the second plurality of protrusions 260 includes protrusions 260 that protrude outward and extend along a depth of the upper portion 250. Each protrusion 260 may define one or various shapes, such as a quadrilateral shape, a rounded shape, and/or one of other various shapes. In other examples, each protrusion may have a shape and/or size that coincides with the shape and/or size of each protrusion of the first plurality of protrusions 240. According to various aspects, the second plurality of protrusions 260 are configured overlap the first plurality of protrusions 240 such that an abutment is defined that at least partially couples the palm dimpler 34 to the inner panel 28. In such aspects, it is generally contemplated that the second plurality of protrusions 260 may be slightly undersized relative to the first plurality of protrusions 240 such that a press-fit interface is defined.

Additionally, it is generally contemplated that the palm dimpler 34 may include various protrusions and/or recesses that assist in coupling the palm dimpler 34 to the outer panel 26 and/or the inner panel 28. For example, the palm dimpler 34 may define a channel 270 on an inner surface 272 of the palm dimpler 34. The channel 270 can extend across a width of the upper portion 250. According to various aspects, the channel 270 can operably receive one or more structures that permit coupling. For example, the channel 270 can receive a protrusion from the inner panel 28, wherein the protrusion is press fit into the channel 270 to define a coupling.

According to various aspects, the lower portion 252 of the palm dimpler 34 may be disposed in the first recess 152 and the second recess 154. In such examples, opposing ends of the lower portion 252 may abut the inner panel 28 proximate the first and second recesses 152, 154. In other examples, the lower portion 252 may define a shape that coincides with the shape of the engagement lip 176 on the central region 170 of the top portion 36 of the waterfall structure 30. According to various aspects, the lower portion 252 may overlap the engagement lip 176 to define an interface and the ends of the lower portion 252 may abut the front section 32 of the inner panel 28 such that the palm dimpler 34 is at least partially coupled to the inner panel 28. It is also generally contemplated that the palm dimpler 34 may be coupled to the inner panel 28 and/or the waterfall structure via various other fasteners and/or engagements without departing from the teachings herein.

Use of the presently disclosed device may provide for a variety of advantages. For example, the trunk assembly 10, by having the inner panel with the integrally formed waterfall structure 30, provides for a vehicle trunk assembly 10 that can be quickly assembled while sealing the stowage compartment 16. In particular, the trunk assembly 10, by including the integrally formed waterfall structure 30 that extends away from the front section 32 of the waterfall structure 30, provides for a hood inner panel 28 with an integrated waterfall structure 30 that can operably seal the stowage compartment 16, while also providing for a structure that may couple to various other vehicle components, such as the grille of the vehicle. Further, the waterfall structure 30, by extending in a direction perpendicular to the inner panel 28 or oblique to the inner panel 28, provides for a structure that can seal both the top region 70 and the front region 72 of the stowage compartment opening 22. Additionally, by utilizing the integrally formed waterfall structure 30, along with one or more fasteners (e.g., rivets), the trunk assembly 10 provides for an assembly that can be efficiently assembled ny reducing the number of manufacturing processes.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A trunk assembly for a vehicle, comprising:

a stowage compartment disposed within the vehicle, the stowage compartment including a base portion and a sidewall encircling the base portion, wherein the sidewall defines a stowage compartment opening; and a hood operable between an opened position and a closed position, the hood further comprising:

an outer panel;

an inner panel coupled to the hood outer panel, wherein the hood outer panel extends over an outer periphery of the hood inner panel; and a waterfall structure integrally formed with a front section of the hood inner panel and extending outward from the front section, the waterfall structure abutting the sidewall to define a sealed interface when the hood is in the closed position; and a palm dimpler at least partially disposed on a top portion of the waterfall structure, the palm dimpler at least partially coupling the outer panel to the inner panel, wherein the inner panel defines a pair of recesses on opposing sides of a top portion of the waterfall structure, and wherein the palm dimpler extends into the pair of recesses.

2. The trunk assembly of claim 1, wherein the stowage compartment opening defines a front region and a top region, and wherein the inner panel abuts the sidewall proximate the top region and the waterfall structure abuts the sidewall proximate the front region when the hood is in the closed position to define the sealed interface.

3. The trunk assembly of claim 1, wherein the waterfall structure includes a top portion, a center portion, and a bottom portion, wherein the bottom portion includes a first section obliquely extending from the center portion and a second section extending from the first section, and wherein the second section extends in a direction parallel to the center portion.

4. The trunk assembly of claim 1, further comprising an inner panel lip extending along an outer periphery of the inner panel, wherein the inner panel lip at least partially extends vehicle-forward beyond the waterfall structure.

5. The trunk assembly of claim 1, further comprising a trim piece coupled to the sidewall, the trim piece abutting the inner panel when the hood is in the closed position to at least partially define a sealed interface.

6. The trunk assembly of claim 1, further comprising a first plurality of protrusions defined on the front section of the inner panel and the waterfall structure and a second plurality of protrusions defined on the palm dimpler, wherein the second plurality of protrusions overlap the first plurality of protrusions to at least partially coupled the palm dimpler to the inner panel.

7. A trunk assembly for a vehicle, comprising:

a stowage compartment disposed within the vehicle, the stowage compartment including a base portion and a sidewall encircling the base portion, wherein the sidewall defines a stowage compartment opening; and a hood operable between an opened position and a closed position, the hood further comprising:

an outer panel;

an inner panel coupled to the hood outer panel, wherein the hood outer panel extends over an outer periphery of the hood inner panel; and a waterfall structure integrally formed with a front section of the hood inner panel and extending outward from the front section, the waterfall structure abutting the sidewall to define a sealed interface when the hood is in the closed position; and a palm dimpler at least partially disposed on a top portion of the waterfall structure, the palm dimpler at least partially coupling the outer panel to the inner panel, wherein the palm dimpler includes an upper portion and a lower portion extending downward from the upper portion, and wherein the upper portion abuts a top surface of the inner panel and the lower portion abuts the waterfall structure.

8. A hood for a vehicle, comprising:

an outer panel;

an inner panel coupled to the outer panel, wherein the outer panel extends over an outer periphery of the inner panel, wherein the inner panel includes an inner panel lip extending around an outer periphery of the inner panel;

a waterfall structure extending outward from a front section of the inner panel; and a first recess defined on the front section of the inner panel and proximate a side of the waterfall structure and a second recess defined on an opposing side of the waterfall structure, wherein the inner panel lip is proximate the first recess and the second recess and at least partially extends beyond the waterfall structure.

9. The hood of claim 8, wherein the waterfall structure includes a top portion, a middle portion, and a bottom portion, and wherein the bottom portion includes a first section obliquely extending from the middle portion and a second section extending from the first section in a direction parallel to the middle portion.

10. A hood for a vehicle, comprising:

an outer panel;

an inner panel coupled to the outer panel, wherein the outer panel extends over an outer periphery of the inner panel;

a waterfall structure extending outward from a front section of the inner panel, wherein the waterfall structure includes a top portion, a middle portion, and a bottom portion, and wherein the bottom portion includes a first section obliquely extending from the middle portion and a second section extending from the first section in a direction parallel to the middle portion; and a palm dimpler at least partially disposed on the waterfall structure, the palm dimpler at least partially coupling the outer panel to the inner panel, wherein the palm dimpler includes an upper portion and a lower portion extending downward from the upper portion, and wherein the upper portion abuts a top surface of the inner panel and the lower portion abuts the top portion of the waterfall structure.

11. A trunk assembly for a vehicle, comprising:

a stowage compartment disposed within the vehicle, the stowage compartment defining a stowage compartment opening; and a hood operable between an opened position and a closed position, the hood further comprising:

an outer panel;

an inner panel coupled to the hood outer panel, wherein the hood outer panel extends over an outer periphery of the hood inner panel;

a waterfall structure integrally formed with a front section of the hood inner panel and extending outward from the front section, the waterfall structure abutting the stowage compartment to at least partially seal the stowage compartment opening when the hood is in the closed position;

a palm dimpler at least partially disposed on the waterfall structure, the palm dimpler at least partially coupling the outer panel to the inner panel; and a first plurality of protrusions defined on the front section of the inner panel and the waterfall structure and a second plurality of protrusions defined on the palm dimpler, wherein the second plurality of protrusions overlap the first plurality of protrusions to at least partially coupled the palm dimpler to the inner panel.

12. The trunk assembly of claim 11, wherein the inner panel defines a first recess on a side of the waterfall structure and a second recess on an opposing side of the waterfall structure, and wherein the palm dimpler includes a lower portion that at least partially extends into the first recess and the second recess.

13. The trunk assembly of claim 11, wherein the stowage compartment includes a base portion and a sidewall encircling the base portion, wherein the sidewall defines the stowage compartment opening.

14. The trunk assembly of claim 13, wherein the stowage compartment opening defines a top region and a front region, and wherein the waterfall structure at least partially seals the front region when the hood is in the closed position.

* * * * *